US012763400B2

(12) United States Patent
Inagaki

(10) Patent No.: US 12,763,400 B2

(45) Date of Patent: Oct. 13, 2026

(54) BATTERY COOLING STRUCTURE FOR VEHICLE

(71) Applicant: SUBARU CORPORATION, Tokyo (JP)

(72) Inventor: Ryo Inagaki, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 518 days.

(21) Appl. No.: 18/371,367

(22) Filed: Sep. 21, 2023

(65) Prior Publication Data

US 2024/0120575 A1 Apr. 11, 2024

(30) Foreign Application Priority Data

Oct. 6, 2022 (JP) ................................ 2022-161742

(51) Int. Cl.

*H01M 10/6563* (2014.01)
*H01M 10/613* (2014.01)
*H01M 10/625* (2014.01)
*H01M 50/242* (2021.01)
*H01M 50/249* (2021.01)
(Continued)

(52) U.S. Cl.

CPC ..... *H01M 10/6563* (2015.04); *H01M 10/625* (2015.04); *H01M 50/242* (2021.01); *H01M 50/262* (2021.01); *H01M 50/271* (2021.01); *H01M 10/613* (2015.04); *H01M 50/249* (2021.01); *H01M 2220/20* (2013.01)

(58) Field of Classification Search

CPC .......... H01M 10/6563; H01M 10/613; H01M 10/625; H01M 50/262; H01M 50/242; H01M 50/271

See application file for complete search history.

(56) References Cited

U.S. PATENT DOCUMENTS 10,389,047 B2 * 8/2019 Fees .................... H01M 50/581
2008/0196957 A1 8/2008 Koike et al.
2010/0294580 A1 11/2010 Kubota et al.

FOREIGN PATENT DOCUMENTS

JP 2007-8443 A 1/2007
WO 2009/098953 A1 8/2009

OTHER PUBLICATIONS

Japanese Office Action dated Jun. 23, 2026 in Japanese Patent Application No. 2022-161742 with machine English translation.

* cited by examiner

*Primary Examiner* — Sarah A. Slifka
(74) *Attorney, Agent, or Firm* — MCGINN INTELLECTUAL PROPERTY LAW GROUP, PLLC

(57) ABSTRACT

A battery cooling structure for a vehicle includes a housing case including a housing part and a cover having an intake hole, the housing case having an internal space as a placement space in which a battery module is disposed; a first duct positioned outside the housing case and provided with a first communicating part that communicates with the intake hole; and a second duct positioned inside the housing case and provided with a second communicating part that communicates with the intake hole. The battery module is provided with battery cells and a high-voltage component that couples the battery cells. Cooling air flows from the first duct to the battery module via the intake hole and the second duct. The first duct is configured to be displaced relative to the second duct when an impact is applied to the first duct due to a collision of the vehicle.

15 Claims, 3 Drawing Sheets

(51) Int. Cl.
*H01M 50/262* (2021.01)
*H01M 50/271* (2021.01)

BATTERY COOLING STRUCTURE FOR VEHICLE

CROSS-REFERENCE TO RELATED APPLICATIONS

The present application claims priority from Japanese Patent Application No. 2022-161742 filed on Oct. 6, 2022, the entire contents of which are hereby incorporated by reference.

BACKGROUND

The disclosure relates to a technical field related to battery cooling structures for vehicles, such as automobiles.

In some of various vehicles, such as automobiles, an on-board battery for supplying power to a motor and each type of electric component is mounted in a baggage compartment (for example, refer to Japanese Unexamined Patent Application Publication (JP-A) No. 2007-8443). JP-A No. 2007-8443 discloses an on-board battery in which a housing case containing a battery module is disposed on an upper side of a floor pan. Such on-board batteries may have a battery cooling structure for cooling a battery module. In one example, a duct is inserted through an intake hole that is formed in a housing case, and the air outside the housing case is made to flow to the battery module as cooling air.

SUMMARY

An aspect of the disclosure provides a battery cooling structure for a vehicle. The battery cooling structure includes a housing case, a first duct, and a second duct. The housing case includes a housing part and a cover. The housing part has an opening at an upper end. The cover has an intake hole and covers the opening. The housing case has an internal space as a placement space in which at least a battery module is disposed. The first duct is positioned outside the housing case and provided, at an end part, with a first communicating part that communicates with the intake hole. The second duct is positioned inside the housing case and provided, at an end part, with a second communicating part that communicates with the intake hole. The battery module is provided with battery cells and a high-voltage component that couples the battery cells. The first duct is configured to allow cooling air to flow from the first duct to the battery module via the intake hole and the second duct. The first duct is further configured to be displaced relative to the second duct when an impact is applied to the first duct due to a collision of the vehicle.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

FIG. 1 is a sectional view of an on-board battery provided with a battery cooling structure.

DETAILED DESCRIPTION

An on-board battery that is mounted in a baggage compartment, as disclosed in JP-A No. 2007-8443, may have an intake hole that is formed in a side surface or a bottom surface of a housing case. In this case, for example, when water or other liquid invades a floor pan, the liquid may enter the inside of the housing case from the intake hole. In one example, a duct may be disposed in such a manner as to surround a side surface or a bottom surface of a housing case. In this case, the length of the duct (cooling passage) tends to increase, and due to being disposed close to, for example, a muffler or the like, the duct easily receives heat from the muffler or the like, which may cause a reduction in cooling efficiency. In consideration of this, in order to improve waterproof performance and cooling performance for a battery module, an intake hole is desirably formed in an upper end (upper surface) of a housing case.

However, an intake hole that is formed in an upper end of a housing case is positioned close to a high-voltage component, such as a bus bar, which is generally provided to an upper surface part of a battery module in many cases. In this structure, for example, when a collision occurs from a rear side of a vehicle, the impact may deform or damage a duct to allow a high-voltage component to be touched from the intake hole, which makes it difficult to ensure safety.

In view of these circumstances, it is desirable to improve waterproof performance and cooling performance for a battery module while safety is ensured.

Figure 1:
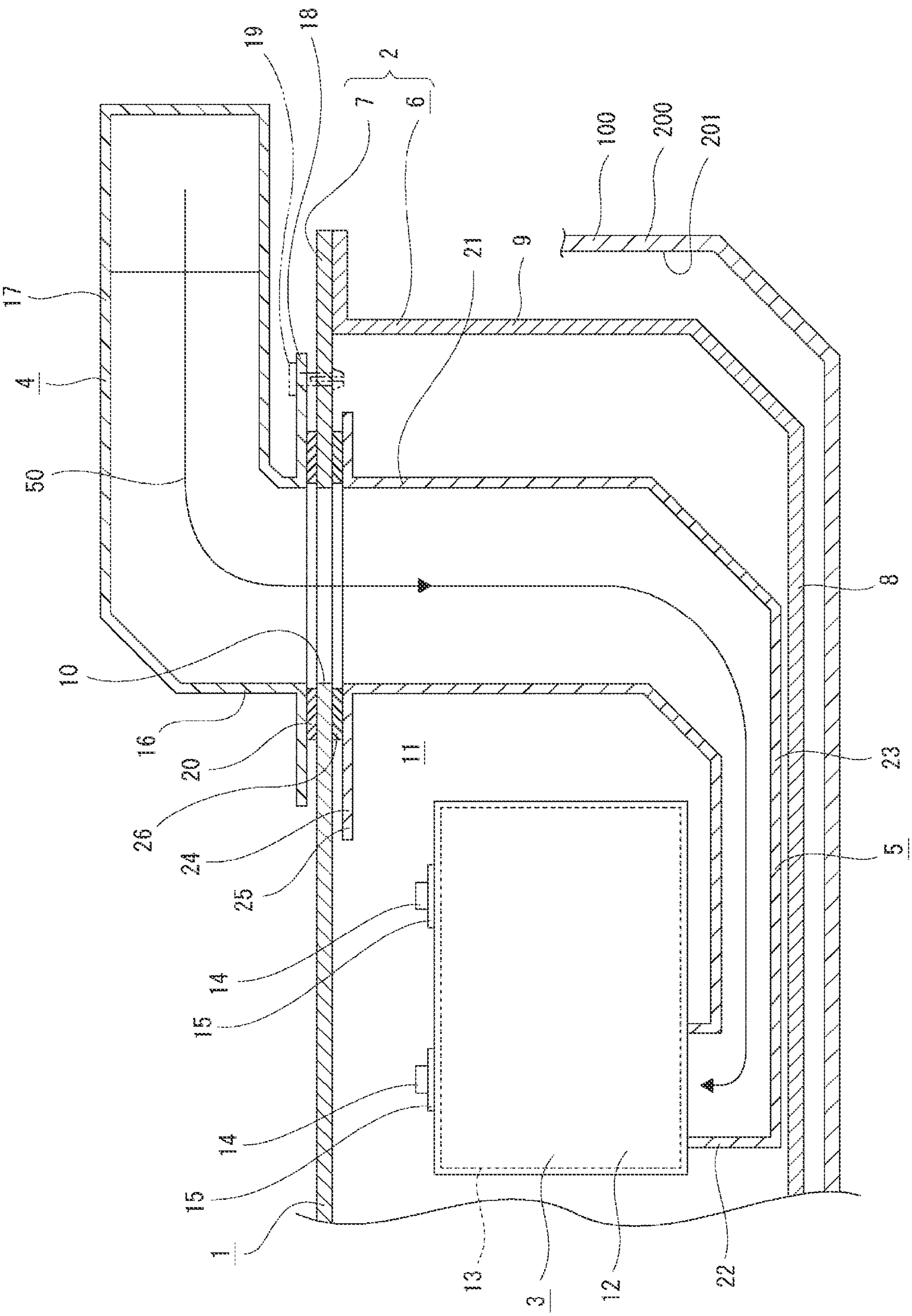
FIG. 1 illustrates an embodiment of a battery cooling structure for a vehicle of the disclosure, which is also illustrated in FIGS. 2 and 3.
Figure 2:
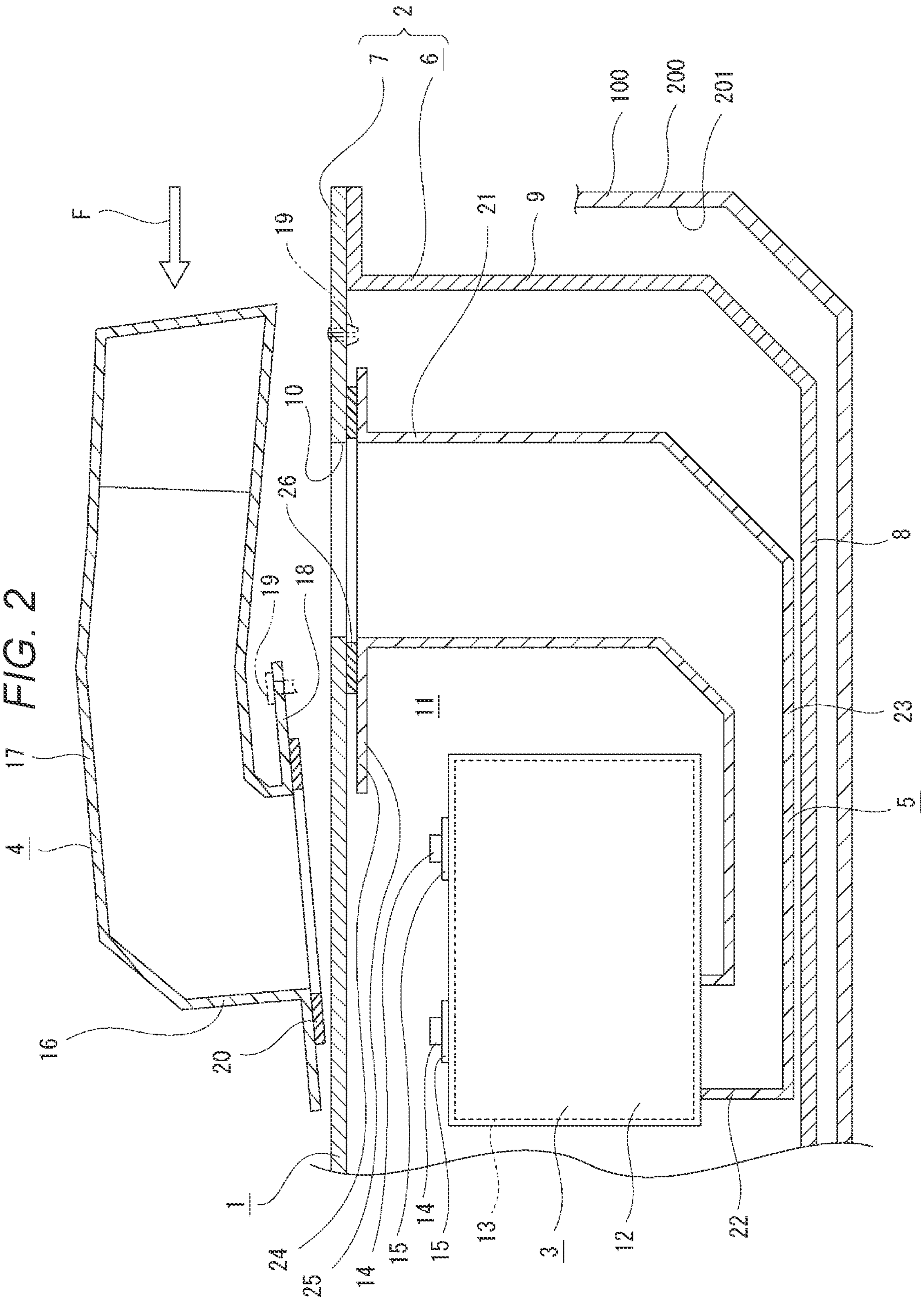
FIG. 2 is a sectional view illustrating a state in which a first duct is displaced relative to a second duct by an impact of a collision.
Figure 3:
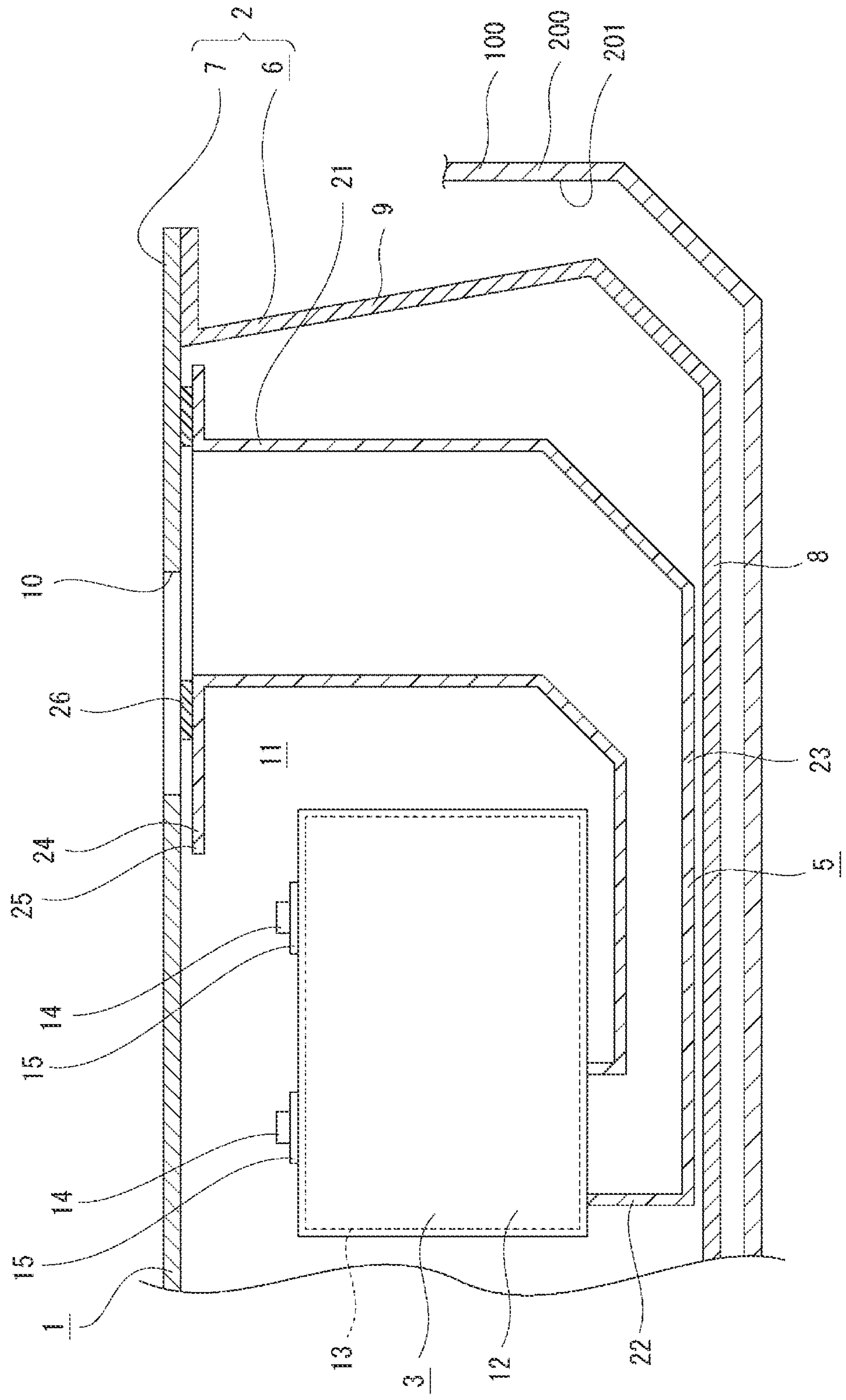
FIG. 3 is a sectional view illustrating a state in which an intake hole is displaced by an impact of a collision.

Hereinafter, an embodiment for implementing a battery cooling structure of a vehicle of the disclosure will be described with reference to the attached drawings (FIGS. 1 to 3). Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Structure and Features of On-Board Battery

First, a structure and features of an on-board battery having a battery cooling structure will be described.

An on-board battery 1 includes a housing case 2, a battery module 3, a first duct 4, and a second duct 5 (refer to FIG. 1). In the on-board battery 1, the housing case 2, the first duct 4, the second duct 5, and a cooling fan (described later) constitute a battery cooling structure for cooling the battery module 3.

A vehicle 100 is provided with a floor pan 200 that opens upward, and the floor pan 200 has an internal space as a placement recess 201. The on-board battery 1 is disposed in the placement recess 201, for example.

The housing case 2 is formed of, for example, a metal material, and it has a housing part 6 and a cover 7. The housing part 6 is formed into a box shape that opens upward, and it has a bottom surface part 8, which faces an upper-lower direction, and a circumferential surface part 9, which continues to an outer circumferential edge of the bottom surface part 8, at a lower edge. The cover 7 is formed into a flat plate shape and is mounted to the housing part 6 so as to cover the opening of the housing part 6 from above, by a mounting member (not illustrated). An intake hole 10 that penetrates in the upper-lower direction is formed in a part close to a rear end of the cover 7. Attaching holes (not illustrated) that penetrate in the upper-lower direction are formed at intervals in a circumferential direction around the intake hole 10. The housing case 2 has an internal space as a placement space 11.

The housing part 6 of the housing case 2 is fixed to the floor pan 200 via a holding frame (not illustrated).

The battery module 3 is disposed in the placement space 11 of the housing case 2. The battery module 3 is positioned, for example, on a front side of the intake hole 10, inside the housing case 2. The number of the battery modules 3 contained in the housing case 2 is not limited to one, and multiple battery modules 3 may be contained in the housing case 2.

The battery module 3 has a cell cover 12 and battery cells 13 that are arranged inside the cell cover 12. The battery cell 13 is provided with two upwardly protruding terminals 14 that are separated from each other. The terminal 14 of one battery cell 13 is coupled to the terminal 14 of the adjacent battery cell 13 by a bus bar 15, whereby multiple battery cells 13 are serially coupled to one another. The bus bar 15 is provided as a high-voltage component that is to be applied with high voltage.

The first duct 4 is formed of, for example, a resin material, and it is disposed outside the housing case 2. The first duct 4 is provided with a first communicating part 16 at an end part and is also provided with a first middle part 17 at a part between the first communicating part 16 and the other end part (not illustrated). The first communicating part 16 has an axial direction in the upper-lower direction and is provided with a flange-shaped attaching part 18 that protrudes outward, at a lower end. Insertion holes (not illustrated) that penetrate in the upper-lower direction are formed in the attaching part 18 at positions corresponding to the attaching holes of the cover 7, so as to be separated from each other in the circumferential direction. The first middle part 17 has an axial direction in a horizontal direction. The other end part of the first duct 4 is attached with a cooling fan (not illustrated).

The first communicating part 16 of the first duct 4 communicates with the intake hole 10 from above. The first duct 4 is attached to the cover 7 by passing a clip 19 through the insertion hole of the attaching part 18 and inserting it in the attaching hole.

A first seal member 20 is interposed between the attaching part 18 and the cover 7. Thus, the first duct 4 and the cover 7 are joined so as to hold the first seal member 20 from above and below, by the clip 19. The attaching part 18 is pressed against the cover 7 via the first seal member 20 by the clip 19, and the first seal member 20 is in close contact with both of the attaching part 18 and the cover 7. The clip 19 is formed of, for example, a resin material, so that it can break when a great impact is applied to the first duct 4.

The second duct 5 is formed of, for example, a resin material, and it is disposed in the placement space 11 of the housing case 2. The second duct 5 is provided with a second communicating part 21 at an end part and is also provided with a second middle part 23 at a part between the second communicating part 21 and the other end part 22. The second communicating part 21 has an axial direction in the upper-lower direction and is provided with a flange-shaped receiving part 24 that protrudes outward, at an upper end. The receiving part 24 is provided with a shield part 25 at a front part. The other end part 22 of the second duct 5 communicates with an inside of the cell cover 12 of the battery module 3 from below.

The second communicating part 21 communicates with the intake hole 10 from below, while being disposed rearward of the battery module 3. Thus, the shield part 25, which is positioned between the intake hole 10 and the bus bar 15 of the battery module 3, is able to shield the bus bar 15.

The second duct 5 is mounted to the housing part 6 of the housing case 2 by a mounting member (not illustrated).

A second seal member 26 is interposed between the receiving part 24 and the cover 7. Thus, the second duct 5 and the cover 7 hold the second seal member 26 from below and above. The cover 7 is mounted to the housing part 6 while being pressed against the receiving part 24 via the second seal member 26, and the second seal member 26 is in close contact with both of the cover 7 and the receiving part 24.

The cover 7 is pressed against the receiving part 24 via the second seal member 26 in this manner, but the second duct 5 is not joined with the cover 7. This enables the cover 7 to be displaced relative to the second duct 5 when a great impact is applied to the housing case 2. In addition, the second duct 5 is also not joined with the first duct 4, and therefore, the first duct 4 is displaceable relative to the second duct 5 when being applied with a great impact.

In the on-board battery 1 thus structured, cooling air 50 is taken in the first duct 4 by the cooling fan and flows to the battery module 3 via the intake hole 10 and the second duct 5, whereby the battery module 3 is cooled.

As described above, the on-board battery 1 has the intake hole 10 in the cover 7 of the housing case 2. This makes it difficult for liquid to enter the housing case 2 from the intake hole 10 even though water or other liquid invades the floor pan 200, whereby waterproof performance for the battery module 3 is improved. In addition, the second duct 5, which is positioned in the placement space 11 of the housing case 2, is not susceptible to effects of heat from a muffler and so on, due to the bottom surface part 8 and the circumferential surface part 9 of the housing part 6. Thus, cooling performance for the battery module 3 is improved.

The first duct 4 and the second duct 5 communicate with the intake hole 10 from above and below, to make the intake hole 10 not exposed. In this state, the bus bar 15 is prevented from being touched from the intake hole 10 by a finger or the like, whereby safety of the on-board battery 1 is ensured although the intake hole 10 is formed in the cover 7.

In the on-board battery 1, the bus bar 15, which is a high-voltage component, is a component that tends to have high temperature, among components constituting the battery module 3. In view of this, a cooling passage for sending the cooling air 50 to the bus bar 15 may be provided for the purpose of improving cooling efficiency of the battery module 3. As described above, the on-board battery 1 has the intake hole 10 in the cover 7, and the intake hole 10 is positioned close to the bus bar 15, which is at an upper end of the battery module 3. Thus, in providing a cooling passage for sending the cooling air 50 to the bus bar 15 from the intake hole 10, a layout of the cooling passage can be easily designed.

The first seal member 20 is interposed between the attaching part 18 of the first duct 4 and the cover 7. Thus, a space between the attaching part 18 and the cover 7 is tightly closed, which prevents the cooling air 50 from flowing out from between the first duct 4 and the cover 7 to the outside, resulting in an improvement in efficiency of sending the cooling air 50 to the battery module 3.

Moreover, the second seal member 26 is interposed between the receiving part 24 of the second duct 5 and the cover 7. Thus, a space between the receiving part 24 and the cover 7 is tightly closed, which prevents the cooling air 50 from flowing out from between the second duct 5 and the cover 7 to the outside, resulting in an improvement in efficiency of sending the cooling air 50, which flows from the first duct 4 into the intake hole 10, to the battery module 3.

The attaching part 18 is provided to the first communicating part 16 and is attached to the cover 7. This structure prevents the first duct 4 from being displaced relative to the cover 7, for example, due to vibrations and the like in travelling of the vehicle 100, and it thereby ensures a stable communicating state between the first duct 4 and the intake hole 10.

Actions at the Time of Collision

Next, actions of the on-board battery 1 at the time of a collision will be described (refer to FIGS. 2 and 3).

The following describes an example of a case in which a tall vehicle, such as a track, collides with the vehicle 100 from a rear side.

In the on-board battery 1 structured as described above, if the vehicle 100 has a collision from a rear side, an impact F is applied to the first duct 4 from the rear side (refer to FIG. 2). The impact F that is applied to the first duct 4 is transmitted to the clip 19 to break it, and joining of the first duct 4 to the cover 7 is released. The first duct 4 is disengaged from the cover 7 and is displaced forward relative to the housing case 2 by a force provided by the impact F. At this time, there is a possibility that the impact F is also applied to the cover 7 via the clip 19, but the cover 7 is hardly displaced due to breakage of the clip 19 and also to being mounted to the housing part 6.

Thus, the impact F that is applied to the first duct 4 is also not easily transmitted to the housing case 2, whereby deformation and breakage of the housing case 2 are prevented. In addition, the impact F is hardly transmitted to the housing case 2, and therefore, the impact F that is transmitted to the second duct 5 via the housing case 2 can be slight. For this reason, in the condition in which the first duct 4 is displaced forward at the time of the collision, the housing case 2 and the second duct 5 are not easily displaced from the positions at the time no collision occurs, and the communicating state between the intake hole 10 and the second duct 5 is easily maintained.

As described above, the on-board battery 1 is configured so that the first duct 4 can be displaced relative to the second duct 5 when the impact F is applied to the first duct 4 due to a collision of the vehicle 100. With this structure, the impact F of the collision is hardly transmitted from the first duct 4 to the second duct 5, whereby the second duct 5 is not easily deformed and broken.

As a result, even when communicating between the first duct 4 and the intake hole 10 is released due to the impact F of the collision, communicating between the intake hole 10 and the second duct 5 is hardly released, and the intake hole 10 and the placement space 11 do not easily communicate with each other. This structure continuously prevents the bus bar 15 (high-voltage component) from being touched by a finger or the like from the intake hole 10, and therefore, waterproof performance and cooling performance for the battery module 3 are improved while safety is ensured.

As described above, the attaching part 18 and the cover 7 are joined by the clip 19. In this structure, when the impact F is applied to the first duct 4 due to the collision, the impact F is transmitted to the clip 19 to break it, and joining of the first duct 4 to the cover 7 is released, resulting in prevention of position displacement of the cover 7 relative to the second duct 5.

This simple structure makes it possible to continuously prevent the bus bar 15 from being touched by a finger or the like from the intake hole 10, while a stable communicating state between the first duct 4 and the intake hole 10 at the time no collision occurs is ensured. Joining of the first duct 4 to the cover 7 is released by breakage of the clip 19, whereby the impact F that is transmitted to the cover 7 and to the second duct 5 is reduced at the time of the collision. The first seal member 20 is made to be in close contact with both of the attaching part 18 and the cover 7 while being pressed thereagainst by the clip 19, and the second seal member 26 is in close contact with both of the receiving part 24 and the cover 7 while being pressed thereagainst. Under these conditions, high sealing performance between the first duct 4 and the cover 7 and between the second duct 5 and the cover 7 is ensured. In addition, the first duct 4 is easily attached to the cover 7 by the clip 19, which enables improving working efficiency in assembling the on-board battery 1.

The second communicating part 21 is provided with the shield part 25 that overhangs on the bus bar 15 side. With this structure, even if the housing case 2 is deformed and the intake hole 10 is displaced forward when the impact F is applied to the first duct 4 due to the collision, the shield part 25 continuously shields the bus bar 15 (refer to FIG. 3).

Thus, the shield part 25 continuously prevents the bus bar 15 from being touched by a finger or the like from the intake hole 10, whereby high safety of the on-board battery 1 is ensured.

Depending on the magnitude and the applied direction of the impact F, the clip 19 may not break, and the cover 7 may be displaced forward together with the first duct 4 at the time of the collision. However, in the condition in which the displacement amount of the intake hole 10 is smaller than the amount of overhang of the shield part 25 of the second communicating part 21, the shield part 25 continuously shields the bus bar 15. In particular, it is presumed that the impact F is small when the clip 19 does not break at the time of the collision, and therefore, the displacement amounts of the first duct 4 and the cover 7 are not likely to be great, and the shield part 25 tends to continuously shield the bus bar 15.

On the other hand, when a large impact F that can greatly displace the intake hole 10 is applied to the first duct 4, the clip 19 breaks to disengage the first duct 4 from the cover 7, and displacement of the intake hole 10 is reduced, whereby the shield part 25 continuously shields the bus bar 15. In addition, the width of the second seal member 26 may be set in consideration of displacement of the intake hole 10. This makes it possible to shield the bus bar 15 by using the second seal member 26 and to continuously prevent the bus bar 15 from being touched by a finger or the like from the intake hole 10, when the intake hole 10 is displaced.

The on-board battery 1 can have a structure in which the first duct 4 and the cover 7 are not joined by the clip 19. In this case, for example, an engaging part for engaging the first duct 4 and the cover 7 with each other may be provided.

The invention claimed is:

1. A battery cooling structure for a vehicle, the battery cooling structure comprising:

a housing case comprising a housing part and a cover, the housing part having an opening at an upper end, the cover having an intake hole and covering the opening, the housing case having an internal space as a placement space in which at least a battery module is disposed;

a first duct positioned outside the housing case and provided, at an end part, with a first communicating part that communicates with the intake hole; and a second duct positioned inside the housing case mounted to the housing part, and provided, at an end part, with a second communicating part that communicates with the intake hole, wherein the first duct is not joined to the second duct, wherein the battery module is provided with battery cells and a high-voltage component that couples the battery cells, wherein the first duct is configured to allow cooling air to flow from the first duct to the battery module via the intake hole and the second duct, wherein the first communicating part is joined to the cover by a breakable member configured to break upon application of an impact to the first duct, and wherein the first duct is further configured to be displaced relative to the second duct when an impact is applied to the first duct due to a collision of the vehicle.

2. The battery cooling structure for the vehicle according to claim 1, wherein the first communicating part is provided with an attaching part that is attached to the cover.

3. The battery cooling structure for the vehicle according to claim 2, wherein the attaching part and the cover are joined by a clip.

4. The battery cooling structure for the vehicle according to claim 1, wherein the second communicating part communicates with the intake hole from below, and the first communicating part communicates with the intake hole from above.

5. The battery cooling structure for the vehicle according to claim 1, wherein the second communicating part is provided with a receiving part that protrudes outward at an end of the second communicating part on a side of the intake hole, and a seal member is interposed between the receiving part and the cover.

6. The battery cooling structure for the vehicle according to claim 5, wherein the second duct is not joined to the cover, such that the cover is configured to be displaced relative to the second duct when an impact is applied to the housing case.

7. The battery cooling structure for the vehicle according to claim 1, wherein a seal member is interposed between the first communicating part and the cover.

8. The battery cooling structure for the vehicle according to claim 1, wherein the first duct comprises a first middle part having an axial direction in a horizontal direction, and the first communicating part has an axial direction in an upper-lower direction.

9. The battery cooling structure for the vehicle according to claim 1, further comprising a cooling fan attached to an end part of the first duct opposite the first communicating part, wherein the cooling fan is configured to draw cooling air through the first duct, the intake hole, and the second duct to the battery module.

10. A battery cooling structure for a vehicle, the battery cooling structure comprising:

a housing case comprising a housing part and a cover, the housing part having an opening at an upper end, the cover having an intake hole and covering the opening, the housing case having an internal space as a placement space in which at least a battery module is disposed;

a first duct positioned outside the housing case and provided, at an end part, with a first communicating part that communicates with the intake hole; and a second duct positioned inside the housing case and provided, at an end part, with a second communicating part that communicates with the intake hole, wherein the battery module is provided with battery cells and a high-voltage component that couples the battery cells, wherein the first duct is configured to allow cooling air to flow from the first duct to the battery module via the intake hole and the second duct, wherein the first duct is further configured to be displaced relative to the second duct when an impact is applied to the first duct due to a collision of the vehicle, and wherein the second communicating part is provided with a shield part that overhangs at least on a side of the high-voltage component.

11. The battery cooling structure for the vehicle according to claim 10, wherein a seal member is interposed between the shield part and the cover.

12. The battery cooling structure for the vehicle according to claim 11, wherein the first communicating part is provided with an attaching part that is attached to the cover.

13. The battery cooling structure for the vehicle according to claim 12, wherein the attaching part and the cover are joined by a clip.

14. The battery cooling structure for the vehicle according to claim 10, wherein the first communicating part is provided with an attaching part that is attached to the cover.

15. The battery cooling structure for the vehicle according to claim 14, wherein the attaching part and the cover are joined by a clip.

* * * * *